(12) United States Patent
Jensen et al.

(10) Patent No.: US 6,697,497 B1
(45) Date of Patent: Feb. 24, 2004

(54) BOUNDARY IDENTIFICATION AND CHARACTERIZATION THROUGH DENSITY DIFFERENCING

(75) Inventors: Del Jensen, Orem, UT (US); Edwards E. Reed, Lindon, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/455,572

(22) Filed: Dec. 6, 1999

Related U.S. Application Data (60) Provisional application No. 60/113,333, filed on Dec. 22, 1998.

(51) Int. Cl.[7] .............................. G06K 9/00; G06K 9/48
(52) U.S. Cl. ........................ 382/100; 382/199; 382/266
(58) Field of Search ................................ 382/195, 199, 382/205, 100, 130, 225, 228, 170, 266, 269

(56) References Cited

U.S. PATENT DOCUMENTS

| | | | |
|---|---|---|---|
| 4,829,009 A | * 5/1989 | Graves | 436/518 |
| 4,910,786 A | 3/1990 | Eichel | 382/22 |
| 4,970,682 A | 11/1990 | Beckwith, Jr. et al. | |

(List continued on next page.)

FOREIGN PATENT DOCUMENTS

| | | |
|---|---|---|
| EP | 0292903 | 11/1988 |
| WO | WO 92/17798 | 10/1992 |
| WO | WO 93/04437 | 3/1993 |

OTHER PUBLICATIONS

Gonzalez et al. "Digital Image Processing." 1977. Addison–Wesley Publishing Co. pp. 328–332.*

Mascio et al., "Automated analysis for microcalcifications in high resolution digital mammograms", pp. 1–9, no later than Sep. 17, 1999.

Maintz et al., "General multimodal elastic registration based on mutual information", one page, no later than Sep. 16, 1999.

Boas, *A Primer of Real Functions*, pp. 18–21, 1960.

Cohen and Feigenbaum, *The Handbook of Artificial Intelligence*, vol. III, pp. 216–224, 1982.

Ginsberg, *Essentials of Artificial Intelligence*, pp. 328–333, 1993.

Chiang and Binford, "Generic, Model–Based Edge Estimation in the Image Surface", pp. 1237–1246, May 1997.

Image processing Khorosware, pp. 1–4, no later than Dec. 10, 1998.

Lozman et al., "Computer Vision", pp. 1–9, no later than Sep. 17, 1999.

Muraki, et al. "3D Surface Reconstruction From Contour Line Image by a Regularization Method" SPIE, vol. 1395, Close–Range Photogrammetry Meets Machine Vision, Proceedings ISPRS, Sep. 3–7, 1990, pp 226–233.

(List continued on next page.)

*Primary Examiner*—Jayanti K. Patel
*Assistant Examiner*—Aaron Carter
(74) *Attorney, Agent, or Firm*—Marger Johnson & McCollom, P.C.

(57) ABSTRACT

Methods and systems are provided for identifying and characterizing boundaries in digital images and other digital data sets. At least two points within a digital image are selected. Clusters of sample points around the points are chosen. A pixel value histogram is generated for each sample point cluster. These histograms define frequency functions. The distance between the frequency functions, called a "density distance" is calculated and analyzed. The nature of the density distance is then used to determine if the two areas are relatively uniform, or if they indicate a presence of a boundary. To further refine the procedure, the method may be applied iteratively by modifying cluster variances, sizes, and distributions, and then reanalyzing the frequency functions generated.

34 Claims, 4 Drawing Sheets

U.S. PATENT DOCUMENTS

| | | | |
|---|---|---|---|
| 4,991,092 A | * 2/1991 | Greensite | 382/131 |
| 5,053,778 A | 10/1991 | Imhoff | |
| 5,140,532 A | 8/1992 | Beckwith, Jr. et al. | |
| 5,142,592 A | 8/1992 | Moler | 382/22 |
| 5,168,161 A | 12/1992 | Markandey | |
| 5,233,670 A | 8/1993 | Dufour et al. | 382/22 |
| 5,276,510 A | * 1/1994 | Cok et al. | 358/500 |
| 5,317,689 A | 5/1994 | Nack et al. | |
| 5,343,390 A | * 8/1994 | Doi et al. | 382/132 |
| 5,454,050 A | * 9/1995 | Nakabayashi et al. | 382/165 |
| 5,694,487 A | 12/1997 | Lee | 382/201 |
| 5,798,923 A | 8/1998 | Laskowski | |
| 5,801,969 A | 9/1998 | Nagahama | |
| 5,809,169 A | 9/1998 | Rezzouk et al. | |
| 5,815,596 A | 9/1998 | Ahuja et al. | |
| 5,832,103 A | 11/1998 | Giger et al. | 382/130 |
| 5,835,099 A | 11/1998 | Marimont | |
| 5,940,523 A | * 8/1999 | Cornman et al. | 382/100 |
| 6,046,828 A | * 4/2000 | Feng et al. | 358/488 |
| 6,052,485 A | * 4/2000 | Nelson et al. | 382/225 |
| 6,142,681 A | * 11/2000 | Gulati | 702/19 |
| 6,215,912 B1 | * 4/2001 | Shiitani et al. | 382/274 |
| 6,263,088 B1 | * 7/2001 | Crabtree et al. | 382/103 |
| 6,289,126 B1 | * 9/2001 | Ishisaka | 382/205 |
| 6,311,194 B1 | 10/2001 | Sheth et al. | 707/505 |
| 6,345,119 B1 | * 2/2002 | Hotta et al. | 382/225 |
| 6,453,053 B1 | * 9/2002 | Wakasu | 564/307 |

OTHER PUBLICATIONS

Cheng, et al. "Analysis and Manipulation Methods of Geographic Informations" $9^{th}$ International Conference on Pattern Recognition, Nov. 14–17, 1988, Rome, Italy, IEEE 1988, pp. 897–900.

Kaneda et al. "Three Dimesional Terrain Modeling and Display for Environment Assessment" Computer Graphics, 1989, pp. 207–214.

Bloor et al. "Local Control of Surfaces Generated Using Partial Differential Equations" Computer Graphics, 1994 pp. 161–169.

* cited by examiner

Fig. 11

BOUNDARY IDENTIFICATION AND CHARACTERIZATION THROUGH DENSITY DIFFERENCING

RELATED APPLICATIONS

The present application claims priority to commonly owned copending provisional application serial No. 60/113,333 filed Dec. 22, 1998, which is incorporated herein by this reference.

FIELD OF THE INVENTION

The present invention relates to the identification and characterization of boundaries in digital images and other digital data sets. More particularly, the invention relates to computer-implemented tools and techniques for detecting and characterizing boundaries such as the boundary between normal and abnormal tissue, between desired and undesired foliage, between original and airbrushed picture regions, and a wide variety of other boundaries.

TECHNICAL BACKGROUND OF THE INVENTION

The terms "edge detection" and "boundary detection" are used interchangeably herein to describe tools and techniques for locating boundaries of meaningful regions. A meaningful region is defined by relatively uniform color, gray level, texture, hue, or other characteristic(s). The edges between regions may be characterized by shape as delta edges, step edges, or crease edges, for example. Edges may also be characterized by magnitude, both as to the "height" of the intensity difference and as to the speed or acceleration of that change. Edges may also be defined in terms of various mixtures of these and/or other characteristics. The regions of interest may be separated spatially, temporally, or both.

At least the following tools and techniques are known, at least individually, for use in edge detection and/or image processing generally: gradient operators, such as Sobel operators; forward differencing; convolution; thresholding; histograms which graph the frequency of occurrence of intensity levels in an image; noise reduction; cluster analysis; spatial differentiation generally, and gradient computations using neighborhoods of variable size in particular; pattern matching for edge detection; edge detection in color images by thresholding the sum of the differences of each feature to produce a binary image indicating whether the total color difference was above the threshold, or in the alternative by computing the sum of binary images given from differentiation and thresholding of each color; tracking and other methods of linking edge elements into a longer contour; detection of multiple straight lines from a set of edge points with a clustering method such as the Hough transform; vectors; vector valued functions; metrics defined over function spaces; Gaussian and other distributions; and the use of analytic or numeric first and second derivatives to find edges.

It is also generally appreciated that boundary detection may be useful in many ways. Possible applications include robotic vision, medical image processing, military intelligence, satellite photo analysis, defect detection during manufacturing, and many others. However, the usefulness of a given tool or technique for boundary detection in a given context depends on many factors, not least of which are the reliability and sensitivity of the tool or technique in identifying and/or characterizing boundaries. Computational efficiency is also important, but it tends to become less of a limiting factor as computational devices grow increasingly powerful and less expensive.

Accordingly, it would provide advancements in the arts to provide new tools and techniques for boundary detection. In particular, it would be useful to combine well-understood conventional tools and techniques in novel ways to detect and/or characterize boundaries which are not readily identified or analyzed using previously known approaches.

Such novel tools and techniques are described and claimed here.

BRIEF SUMMARY OF THE INVENTION

The present invention provides improved tools and techniques for detecting and/or characterizing boundaries in digital data. One embodiment according to the invention, which is tailored for use with two-dimensional pixel image data and tailored in other ways as well, proceeds as follows.

A first image point p00 having coordinates (x0,y0) is selected. The coordinates (x0,y0) are in the domain of a function which maps spatial coordinates to pixel values. A first cluster c00 of sample image points distributed around point p00 is then chosen. The cluster c00 is in the range of a function which maps from {a spatial coordinate such as (x0,y0), a distribution such as Gaussian distribution, distribution parameters such as the variance, and the number of sample points to use} to a set of spatial coordinates which identifies the sample points in a cluster.

The pixel values of the sample points in cluster c00 are determined, and are used to define a pixel value histogram which defines a first frequency function Fp00c00. The frequency function partitions or otherwise divides the range of possible pixel values. For instance, suppose the image is a grayscale image with pixel values in the range from 0 to 255. The partition could use 256 intervals, with each interval containing a single pixel value. Alternatively, the partition could include eight intervals, each of which contains eight adjacent pixel values; a wide range of other interval definitions could also be used. The frequency function maps the intervals into a range of non-negative integers, with the integer for each interval representing the frequency of cluster sample points having a pixel value in that interval.

A second point p10 having coordinates (x1,y0) is selected. In the simplest case, x1 equals x0 plus an increment dx, but the coordinate values xn may also be chosen according to a nonlinear function, chosen randomly, or chosen in some other manner. A second cluster c10 of sample points about p10 is determined using the same distribution function and variance used with the first cluster. The second cluster c10 defines a second frequency function Fp10c10 in a manner similar to that described above.

The distance between the two frequency functions, which may be denoted symbolically as ∥Fp10c10−Fp00c00∥, is herein called a "density difference". The density difference value depends on the points p10 and p00, on their respective sample point clusters c10 and c00, and on the metric used to measure the difference between the two frequency functions. One familiar metric which is suitable for use is defined as the square root of the integral over the partitioning intervals of the square of the absolute value of the difference between the two frequency function values on the corresponding intervals; this is the standard Lebesgue measure applied to frequency functions according to the invention. Other metrics may also be used; metrics generally and their properties such as positivity, symmetry, and satisfaction of the triangle inequality are familiar.

By way of analogy to numeric approximations of differentials obtained through techniques such as forward differencing, these density differences may be viewed as analogs of a differential or derivative of a frequency function. Given a two-dimensional data set such as an array of pixels, one may obtain density differences in both the X and Y directions; in N-dimensional spaces, one may obtain density differences in N directions. Using such frequency function partial derivative analogs, it is also possible to define a vector field whose elements are analogous to frequency function gradients. For convenience, these results are referred to hereafter simply as frequency derivatives and frequency gradients, respectively.

The behavior of frequency derivatives and/or frequency gradients can help indicate the presence and the nature of boundaries in the array of pixels or other underlying digital data set. For instance, zeros (or differences below a specified tolerance) in the frequency derivatives indicate there was relatively little change in the frequency function values, which in turn indicates relative uniformity of the corresponding pixel values. Alignment in gradient fields may also indicate boundaries.

To help characterize boundaries, two or more frequency derivatives may be obtained and then compared. Each frequency derivative may use a different number of sample points in clusters, a different increment between cluster centers, or a different variance in the distribution of cluster points, for example. In the analysis of tissue changes, the same spatial coordinates and cluster points may be used while the pixel values change; the boundary may be viewed as temporal rather than spatial, but the invention may be used to advantage nonetheless. Regardless of whether the boundaries are spatial or temporal, the degree of correlation between the frequency derivatives may be empirically associated with particular boundary characterizations.

The invention provides a boundary detection and characterization mechanism in any space of interest. The invention is not limited to images and pixels, or to digital data which represents a single snapshot in time. Any digital data set which contains regions of relative uniformity may be analyzed, regardless of whether the data was obtained analytically, empirically, through survey or sampling, computationally, or otherwise.

In summary, numerous edge detection tools and techniques are known. However, the present invention provides boundary detection and characterization tools and techniques which are not available using other approaches. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and devices for detecting and/or characterizing boundaries in digital data sets. Various components of the invention are discussed in turn below. In describing methods, devices, signals, and systems according to the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms are defined, either explicitly or implicitly, both here in the Detailed Description and elsewhere in the application file.

Notation

Two kinds of notation employed herein. The Summary of the Invention above employs notation which does not require special fonts or typesetting techniques such as subscripts, while this Detailed Description employs a notation closer to traditional mathematical notation. For a given reader, it may be the case that some aspects of the invention are more readily described using one notation, while other aspects are better described using the other notation. However, the invention is not limited to embodiments described in one or the other of the notations, but instead includes features described in either or both notations.

Data Sets and Computers Generally

Suitable data sets for analysis according to the invention include two-dimensional pixel arrays; three-dimensional pixel sets; color pixels using RGB, HSV, or another color space; grayscale pixels; pixels or voxels obtained from an MRI, NMR, or CAT scan or other medical or scientific imaging tool; crystalline lattice structure data; and other discrete data sets which map an N-dimensional space to an M-dimensional space.

Figure 1:
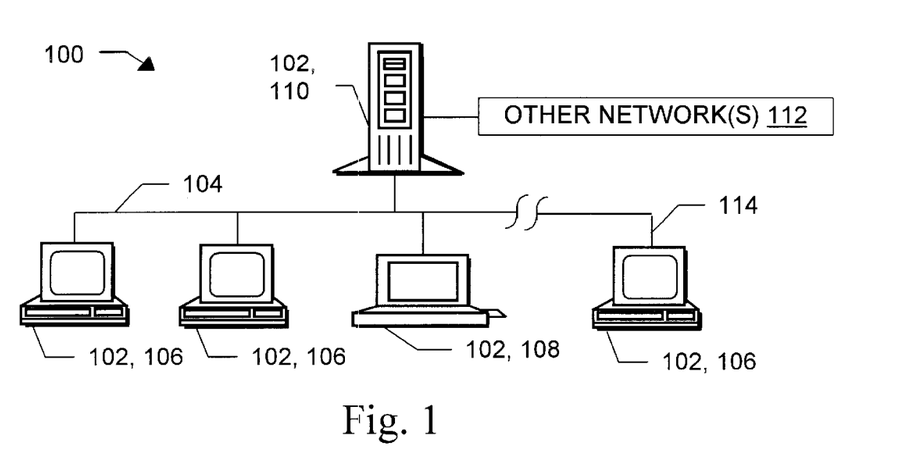
FIG. 1 is a diagram illustrating a network of computers which are individually and collectively among the many systems suitable for use with the present invention.

Systems according to the invention are designated generally at 100 in FIG. 1. As shown in FIG. 1, a system 100 may include individual computers 102 and/or computer networks 104 which have been configured through software and/or special-purpose hardware to operate according to the invention. Suitable computer networks 104 include, by way of example, local networks, wide area networks, and/or the Internet. "Internet" as used herein includes variations such as a private Internet, a secure Internet, a value-added network, a virtual private network, or an intranet. The computers 102 connected by the network or used in isolation according to the invention may be workstations 106, laptop computers 108, disconnectable mobile computers, servers 110, computing clusters, mainframes, or a combination thereof The computer hardware may initially be general-purpose, special purpose, stand-alone, and/or embedded; general-purpose hardware is configured by software to operate according to the invention. The network 104 may include or connect to other networks 112, such as one or more LANs, wide-area networks, wireless networks (including infrared networks), Internet servers and clients, intranet servers and clients, or a combination thereof, through a gateway or similar mechanism.

The network 104 may include Novell Netware® network operating system software (NETWARE is a registered trademark of Novell, Inc.), NetWare Connect Services, VINES, Windows NT, Windows 95, Windows 98, Windows 2000, LAN Manager, or LANtastic network operating system software, UNIX, TCP/IP and NFS-based systems, Distributed Computing Environment software, SAA software (VINES is a trademark of Banyan Systems; NT, WINDOWS 95, WINDOWS 98, WINDOWS 2000, and LAN MANAGER are trademarks of Microsoft Corporation; LANTASTIC is a trademark of Artisoft; SAA is a mark of IBM).

One system according to the invention includes several servers 110 that are connected by network signal lines 114 to one or more network clients. The servers and network clients may be configured by those of skill in the art in a wide variety of ways to operate according to the present invention. In addition to their edge detection and/or characterization functions, the servers 110 may be configured as Internet servers, as intranet servers, as directory service providers or name servers, as software component servers, as file servers, or as a combination thereof The servers 110 or clients may be uniprocessor or multiprocessor machines. The servers 110 and clients each include an addressable storage medium such as random access memory and/or a non-volatile storage medium such as a magnetic or optical disk.

Suitable network clients and suitable individual computers include, without limitation, personal computers, laptops 108, workstations 106, and (in the case of a network) dumb terminals. The signal lines 114 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media.

In addition to the computers 102, a printer, an array of disks, and/or other peripherals may be attached to a particular system. A given computer 102 may function both as a client and a server; this may occur, for instance, on computers running Microsoft Windows NT software. Although particular individual and network computer systems and components are identified here, those of skill in the art will appreciate that the present invention also works with a variety of other networks and computers.

The servers 110 and the network clients and individual computers 102 are capable of using floppy drives, tape drives, optical drives or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM, flash memory, and other computer system storage devices. The substrate configuration represents data and instructions which cause the computer system to operate in a specific and predefined manner as described herein. Thus, the medium tangibly embodies a program, functions, and/or instructions that are executable by the servers and/or network client computers and/or individual computers to perform edge detection and/or edge characterization steps of the present invention substantially as described herein. The invention also provides novel signals which are used in or by such programs. The signals may be embodied in "wires", RAM, disk, or other storage media or data carriers.

Suitable software and/or hardware implementations of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Overview of Density Differencing

There are many application areas in which it is desirable to compute a derivative of a function of one or more variables. For a digital signal one can often only approximate the derivative, either by some form of difference method (e.g., a Sobel filter) or by fitting a curve (or surface) and solving analytically. When working with a function of two or more variables, one estimates the partial derivatives to approximate the gradient.

Consider the vector valued function $$G:R^n \rightarrow R^m, \; y=G(x).$$

where $y=[y_1, Y_2, Y_3, Y_m]$, $x=[x_1, x_2, x_3, \ldots x_n]$. The scalar function $$g:R^n \rightarrow R, \; g(x)=\|G(x) \cdot N\|, \; N \in R^m, \; \|N\|=1$$

can be defined.

Given a positive real number v, we can construct a relative neighborhood of x that is normally distributed in $R^n$ with center x and variance v; call it $^v n_x$. Let x be the random variable defined by the function g restricted to the sample space $^v n_x$. The random variable x has an associated frequency function $f_x$.

We define the density difference of G in the direction $(x_2 - x_1)$ as $$e[\int (f_{x2}-f_{x1})^2]^{1/2},$$

where e=1 if the variance of $x_2$ is greater than or equal to the variance of $x_1$, e=−1 otherwise.

By way of example, consider a color bit mapped image. In this case the function G: $R^2 \rightarrow R^3$ associates a pixel at (x, y) on the view surface with a triple (r, g, b) representing the red, green and blue intensities respectively. If we choose $N=[1/\sqrt{3}, 1/\sqrt{3}, 1/\sqrt{3}]$, then g is just the grayscale transformation. By differencing in both the x and y directions we can construct a pseudo-gradient that is sensitive to subtle changes in texture, such as the boundary around a patch of sand that is slightly coarser than the surrounding sand. Classical derivatives may fail to detect such boundaries.

Density Differencing provides a numerical difference operator that is sensitive to changes in the density function associated with a real or vector valued function of one or more variables. By way of example, such an operator may be effective at distinguishing subtle boundaries between neighboring elements of a given digital image.

The density difference is computed by differencing the shape of the density functions (differencing in a sense such as $\mathcal{L}^2$) restricted to two adjacent relative neighborhoods in the spatial or temporal domain.

For an example of the utility of such a method, consider an x-ray image of soft tissue where subtle changes in tissue consistency may indicate an active-pathological process. Correctly interpreting such images can be a challenge, and Density Differencing may be a useful addition to the diagnostician's toolset.

As another example consider a stock image supplied with a photo-editing product. Distinct artifacts may be revealed which show evidence of "touch up" editing done to remove unwanted visual elements from the digital image. Such artifacts may be difficult to detect with the standard set of edge detection methods in use today.

Figure 2:
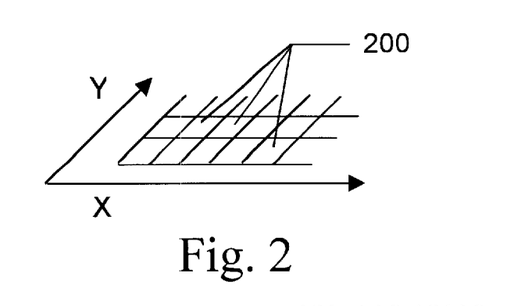
FIG. 2 is a diagram illustrating part of a grayscale image which is represented as a rectangular array of pixels for analysis according to the present invention.

By way of example we will consider a digital image, such as a scanned photograph or a radiological image. The claims of the invention are not necessarily restricted to such data sets. A grayscale image is typically represented as a rectangular array of discrete elements called "pixels" as illustrated in FIG. 2. The pixels 200 uniformly tile the logical view surface, and to each pixel there corresponds a scalar value from a discrete range (often the integer values [0–255]) which represents an intensity. We can model the image as a function I: $R^2 \to R$ with a domain restricted to some (closed or bounded) region of $R^2$ and the image restricted to some (closed or bounded) interval of R.

Figure 3:
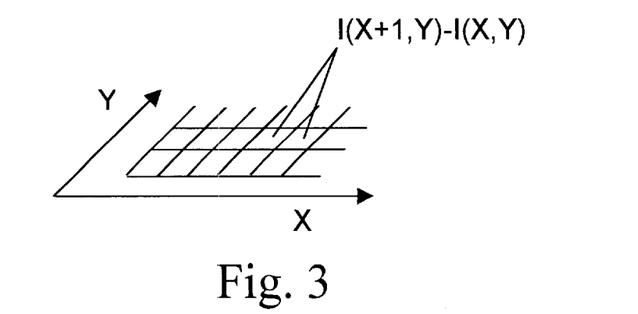
FIG. 3 is a diagram illustrating density differencing according to the invention.

One classical method used to estimate a derivative for I(x,y) is forward differencing (see FIG. 3), which in its most basic form is computed as $$\partial I/\partial x \approx I(x+1,y) - I(x,y),$$

$$\partial I/\partial y \approx I(x,y+1) - I(x,y).$$

Figure 4:
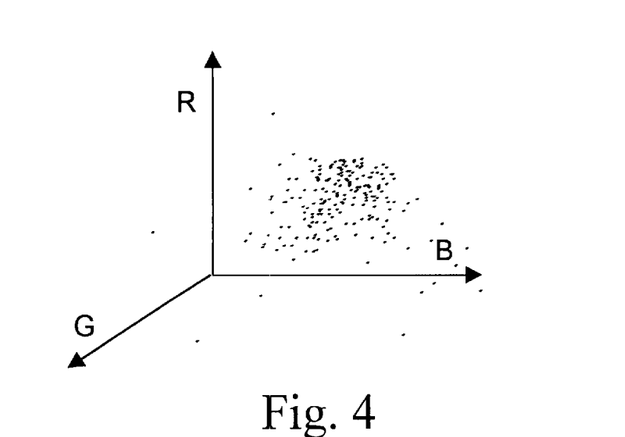
FIG. 4 is a diagram illustrating a density difference in three-space according to the invention.
Figure 5:
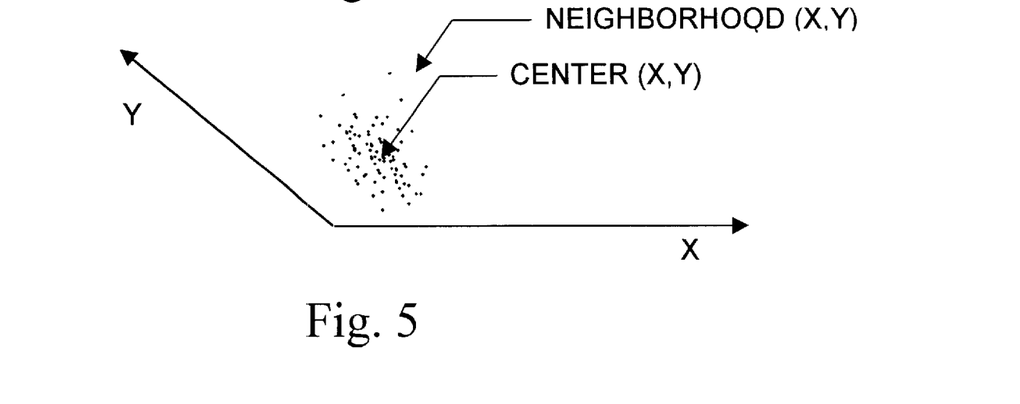
FIG. 5 is a diagram illustrating the density difference of FIG. 4 interpreted as a relative spatial neighborhood n(x,y).

The invention provides another kind of operator, to perform density differencing, which estimates the difference between the frequency distributions of I for two neighborhoods in the spatial domain, e.g.:

$$\partial^* I/\partial^* x \approx \delta_{n(x+1,y)} - \delta_{n(x,y)}$$

$$\partial^* I/\partial^* y \approx \delta_{n(x,y+1)} - \delta_{n(x,y)}$$

where $\delta_{n(x,y)}$ is the density function (also called the pdf or probability density function) of I, restricted to a relative neighborhood n(x,y) of (x,y) (see FIG. 4, here shown for RGB rather than grayscale). The relative spatial neighborhood n(x,y) can be generated by taking a finite sample of $R^2$ under the normal distribution function with center (x,y) and some heuristically specified variance (see FIG. 5). Since we are differencing the functions $\delta_n$, $\delta_k$ we can adopt the standard $\mathcal{L}^2$ norm (also denoted herein the standard Lebesgue metric):

$$\|\delta_n - \delta_k\| = [\int (\delta_n - \delta_k)^2]^{1/2}$$

With a valid metric we then define the difference $\delta_n - \delta_k$ as:

$$\delta_n - \delta_k = \mu \|\delta_n - \delta_k\|$$

where $$\mu = 1 \text{ when } \sigma^2(\text{image}(n)) \geq \sigma^2(\text{image}(k)),$$

$$\mu = -1 \text{ otherwise}.$$

One may view $\mu$ as the sign of the change in entropy in transitioning (discretely) from the k neighborhood to the n neighborhood. The factor $\mu$ allows us to define a notion of directional derivative that is consistent with the classical notion of derivative, in that it associates a notion of "average behavior" of I with each point of the domain. Smoothness of I may be defined in terms of the existence and affinity of the directional derivatives, etc.

To generate the finite, relative neighborhoods n(x,y), a sample size and a spatial variance are specified. The sample size of the neighborhood determines resolution in the frequency space, and should normally be at least twice the highest frequency that we wish to resolve (the Nyquist frequency). The spatial variance determines resolution in the spatial domain.

Figure 9:
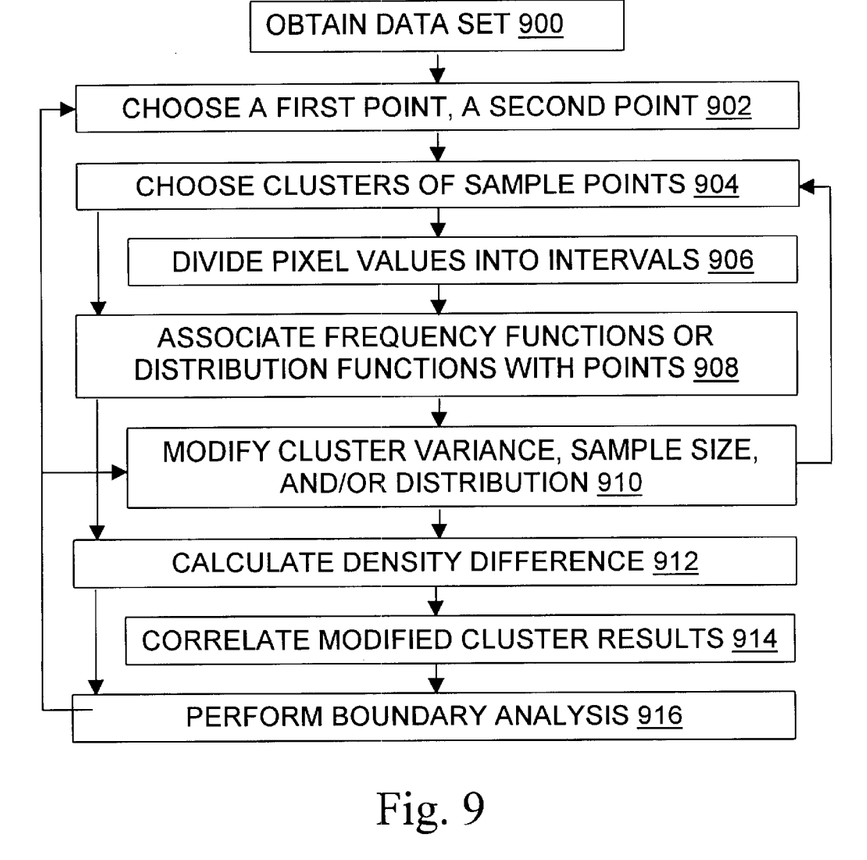
FIG. 9 is a flowchart illustrating methods according to the invention.

In terms of the flowchart which is shown in FIG. 9 and discussed in detail below in the section on Methods, the function G provides a digital data set during a step 900. The points (x,y) and (x+1,y) are examples of first and second points chosen during a step 902; the points (x,y) and (x,y+1) are likewise suitable points which may be chosen during an iteration of step 902. The neighborhoods are clusters chosen during a step 904. The density functions are associated with the chosen points during a step 908. The difference $\delta_n - \delta_k$ is calculated during a step 912, and used to detect and/or characterize edges during a step 916.

Finally, to restate a few important points:

1. There is no restriction that the density function be one-dimensional in domain. Although one example above was for a grayscale image, the density function depicted in FIG. 4 is defined on a three dimensional domain to illustrate the lack of an inherent restriction to one-dimensional density functions.

2. The domain of the function to be differentiated in one example above was $R^2$. In general the domain can be of arbitrary (but finite) dimension.

3. For f: $R^n \to R^m$, rather than generate an m-dimensional density function one could consider m distinct density functions to generate the m×n differential.

More on Methods for Boundary Detection and/or Characterization

The following text refers to FIGS. 6 through 9 to further illustrate the invention. Although FIG. 9 shows a particular order for various steps, those of skill in the art will appreciate that steps illustrated and discussed here may be performed in various orders or concurrently, except in those cases in which the results of one step are required as input to another step. Likewise, steps may be omitted unless called for in the claims, regardless of whether they are expressly described as optional in this Detailed Description. Steps may also be repeated, or combined, or named differently.

Figure 6:
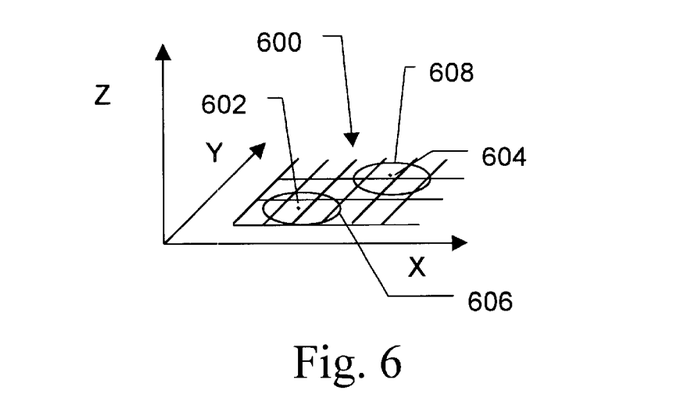
FIG. 6 is a diagram illustrating sample point clusters according to the invention.

In an obtaining data set step 900, an appropriate data set is obtained by the inventive system; the data set obtained may be part of a larger data set. Suitable data sets for analysis according to the invention include those discussed herein, such as pixel arrays or sets using RGB, HSV, or another color space or grayscale; pixels or voxels obtained from imaging equipment; crystalline lattice structure data; data generated by scanning, by rendering in a simulation or other environment, and other discrete data sets which map an N-dimensional space to an M-dimensional space. FIG. 6 shows one such data set, indicated generally at 600.

A suitable increment may be chosen to be used as the distance between the first and second points. The increment may be input by a user, or a default value such as one pixel or one voxel may be used. The increment is preferably adjustable, so that attempts can be made to detect and/or characterize boundaries in the data set 600 using different increments.

During a step 902 of choosing a first point and a second point, two points in the digital data set 600 are chosen; as examples, FIG. 6 shows chosen points 602 and 604. Known or inventive tools and techniques may be used to choose points of interest, such as noise filtering, ray projection, segmentation, thresholding, Gaussian filtering, or other approaches that have been developed to focus on the "important" or "interesting" parts of pictures, namely, parts deemed likely to contain edges, and/or parts in which the presence, nature, or absence of edges is considered worth determining.

As noted elsewhere, the terms "first point" and "second point" are used merely to indicate the selection of two points; the terminology does not imply that the first point must be chosen before the second point, or that the steps can be performed only once, with a single pair of points.

After suitable points have been chosen, during a step 904 clusters of sample points are chosen. The sample points are distributed about the two chosen points in some specified manner. Clusters can be defined in part by a radius, as shown by the example clusters 606, 608, but other known or inventive methods may also be used. For instance, the sample points may be chosen to fit a Gaussian distribution about the given point. Other cluster distributions may also be used to form clusters of sample points during step 904, including without limitation the following familiar distribution functions: binomial, Cauchy, chi, exponential, non-central, alpha, beta, gamma, geometric, log, Pareto, power, Poisson, semi-circular, triangular, and their variations, alone and in combination.

The chosen clusters can each have the same number of sample points distributed according to the same distribution function and the same variance. However, such exact similarity is not always desired or required, in which case the points in different clusters can be distributed with different variances, for instance. In particular, as noted elsewhere cluster parameters may be modified during a step 910 to produce different results which are then correlated 914 and analyzed 916 to permit more subtle edge detection and characterization when the data set includes a color image.

Figure 7:
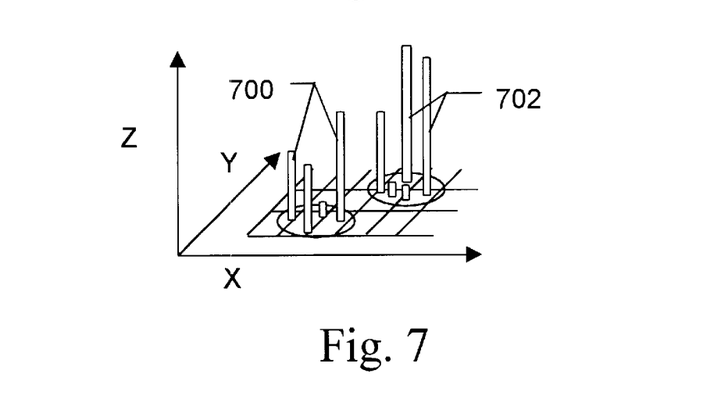
FIG. 7 is a diagram illustrating pixel values within the sample point clusters of FIG. 6.
Figure 8:
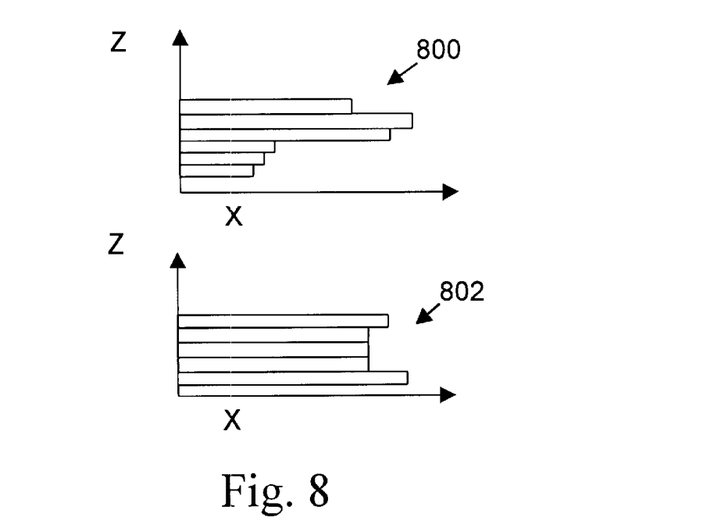
FIG. 8 is a diagram illustrating histograms formed from the pixel values within sample point clusters.

In some embodiments, the possible range of pixel values is divided into intervals during a step 906; one choice is for each interval to contain one pixel. That is, some thresholding or rounding may be done on the pixel or voxel values. In the example, the pixels within the respective clusters of sample points 606, 608 are mapped to interval values 700, 702 as shown in FIG. 7. These interval values then define pixel value histograms or frequency functions 800, 802.

During a step 908, the inventive system associates a frequency function with each of the first and second points. During an alternative method, the system associates a distribution function with each of the two points during step 908, rather than associating frequency functions, and subsequent steps of the method calculate distance 912 and perform boundary analysis 916 using distribution functions instead of frequency functions. That is, one form of density differencing uses distribution functions in place of frequency functions; distribution functions are the integrals of corresponding frequency functions. For convenience, distribution functions and frequency functions are collectively known herein as "JRC functions". JRC functions are generally integrable over the spatial or other digital data domain. The density function $\delta_{n(x,y)}$ discussed above is a JRC function which can be associated with chosen point (x,y) during step 908.

Some embodiments parameterize the cluster definition during a step 910 and repeat steps 904, 908 to obtain multiple JRC function pairs for a given point pair. For instance, if the clusters are defined by a Gaussian distribution of sample points, then step 910 may include a parameterization of that Gaussian distribution. The parameterization involves creating several Gaussian distributions for each point pair by changing the variance and/or another parameter such as the sample size or the distribution used (e.g., Poisson rather than Gaussian). The resulting gradient vector clouds obtained during a density differencing step 912 will each characterize the sample space slightly differently, providing a different viewpoint arising from the point pair. By investigating the interaction 914 between the several gradient vector clouds, a more detailed characterization of the sample space can be obtained. Analogous parameterization and correlation mechanisms are sometimes used in magnetic resonance imaging (MRI).

More generally, during the step 912 the density difference for the pair of JRC functions is calculated. This may be accomplished using various metrics. In particular, the standard Lebesgue metric may be used, or another metric, as noted in the discussion of density differencing above. Standard numerical analysis algorithms and other computational tools and techniques may be employed.

During the step 916, the gradient vector cloud correlations and/or density differences are analyzed. As indicated in the Figure, this analysis will often involve density differences obtained using many JRC function pairs and/or many point pairs rather than a single density difference from a single point pair. Analysis may be aided by studying the relationship between density differences and various test data set edges to determine how the density differences indicate the presence and/or character of the edges. A neural net may be trained, or conclusions may be drawn directly by test personnel.

In general, however, an edge in the digital data set being analyzed will be indicated by a relative magnitude change in the density differences derived from that data set. For instance, two points separated by an edge will tend to provide a greater density difference than two points which lie on the same side of the edge.

More on Systems

Figure 10:
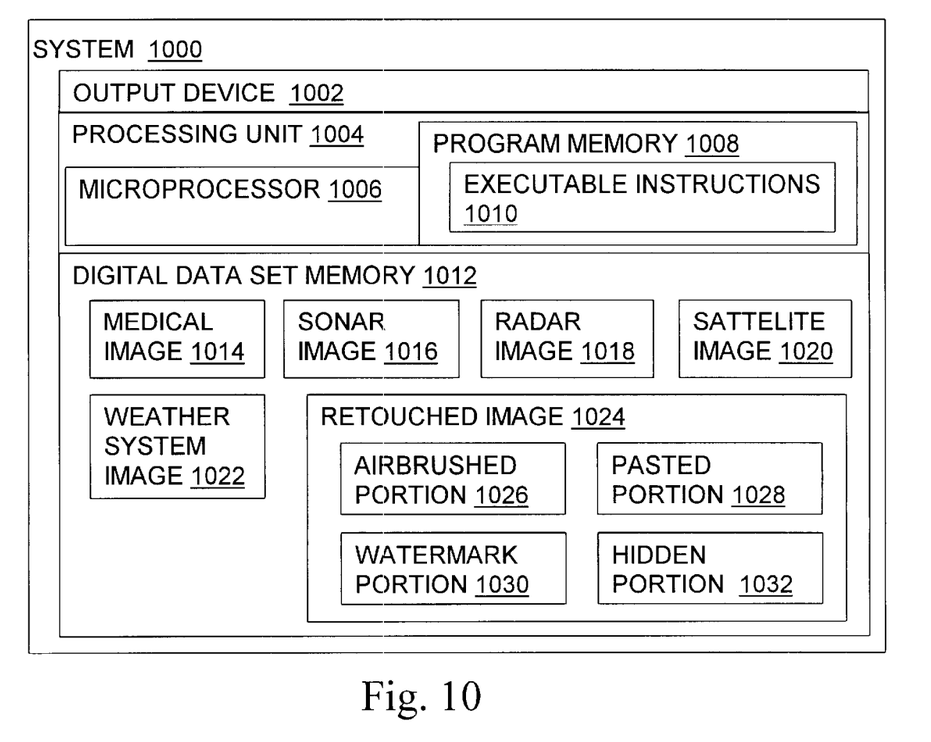
FIG. 10 is a diagram further illustrating a computer system according to the invention.

FIG. 10 further illustrates systems according to the invention in the form of an example system 1000. The system 1000 embodies one or more computers, such as the computers 102, and may include network connections, clusters, and other connective technologies. Suitable output devices 1002 include monitors or displays, three-dimensional displays (some of which are being researched and developed at present to improve their commercial viability), and other output devices. The output device 1002 may be matched in some cases to the particular type of data set being analyzed, as when photographic inputs are annotated or enhanced by the system 1000 to display edges identified during the boundary analysis step 916.

The inventive methods can be implemented in software running on processing units 1004 such as computers 102, or on special purpose hardware 1002. Thus, a suitable microprocessor 1006, memory 1008, and instructions 1010 may include off-the-shelf processor(s) interoperating with memory 1008 configured by instructions 1010 that perform steps illustrated in FIG. 9. Alternatively, the microprocessor 1006 may include special purpose circuitry, such as an ASIC or a configured Field Programmable Gate Array, and the executable instructions may be in the form of microcode or other low-level instructions.

A memory 1012 comprising volatile and/or non-volatile memory elements contains at least one digital data set. As examples, several data sets are shown but only one (or a portion of one) need be obtained during step 900 to be subsequently operated on by the inventive method. The examples shown include a medical image 1014 such as a CAT scan or other examples discussed elsewhere herein; a sonar image 1016; a radar image 1018; a surveillance or other satellite image 1020; a weather system image 1022; and a retouched image 1024 containing one or more edge-related artifacts such as an airbrushed portion 1026, a pasted portion 1028, a watermark 1030, and a steganographically hidden portion 1032. The underlying source of the image in question may be analog or computational, that is, scientific visualization or other computer-generated images can be analyzed in addition to images derived directly from sources in the world around us.

More on Signals

Figure 11:
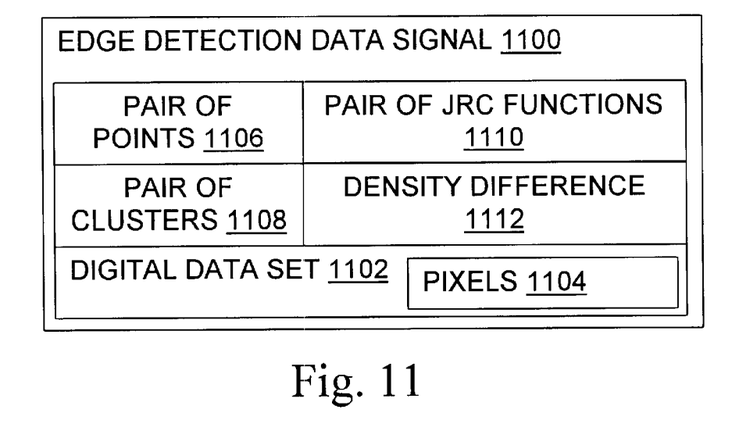
FIG. 11 is a diagram illustrating an edge detection signal according to the invention.

FIG. 11 illustrates signals according to the invention, by reference to an example signal 1100. Inventive signals may be embodied in computing systems 1000, in computer-readable storage media (volatile and/or non-volatile), and/or in "wires" in a network such as the network 104. For convenience, several signal components are shown here in a single Figure, but signal components may be omitted unless called for in the claims, regardless of whether they are expressly described as optional in this Detailed Description. Signal components may also be repeated, or combined, or named differently.

The illustrated signal 1100 includes a digital data set 1102, such as a set containing pixels 1104. As discussed elsewhere herein, a wide variety of digital data sets may be analyzed by the invention, including those with pixels or voxels, color or grayscale, computed or sampled, and so on. In particular, the digital data set includes at least one pair of points 1106, shown separately for emphasis. As discussed above, a pair of clusters 1108 is obtained from the point pair 1106 using a Gaussian distribution, for instance. Through the invention, a pair of frequency functions or other JRC functions 1110 is then obtained from the clusters 1108. A density difference 1112 obtained by differencing the JRC functions 1110 can then be analyzed during step 916 by the system 1000.

Additional Examples

One embodiment detects abnormal crystal growth. As a crystal grows, a regular crystalline lattice is formed. If the crystal growth is uneven then there will be changes in the lattice because of the uneven growth. The embodiment uses computer hardware and/or software 1000 configured to operate as described herein to detect the boundary between each area of change.

Another embodiment detects tampering with images. When an electronic image 1024 is touched up by some digital tool (e.g. an airbrush) a distinct boundary is formed at the junction of the original image and the affected area. This is the case even if the function performed by the digital tool is based on the characteristics of the region being changed. Modifications not visible to the human eye can be detected using a system according to the invention.

Another embodiment detects changes in grass or other foliage. Large areas of foliage depicted in a high-altitude or satellite image 1020, for instance, can be examined by the invention to detect the introduction of a grass or foliage that is different from the grass of foliage desired. Grass detection would be possible by characterizing the gradient vector population of an image of each type of grass or foliage.

Another embodiment detects camouflage. The presence of a camouflaged installation may be determined with the invention. Because the camouflage only approximates the surrounding terrain, the camouflage will have a distinct gradient vector signature recognizable via the invention.

Another embodiment works in conjunction with medical imaging. Medical images 1014 (e.g., mammogram, CAT-scan, x-ray, etc.) must normally be inspected by a highly trained diagnostician because of the difficulty of recognizing abnormal growth formations on current imaging media. Changes in tissue type would be apparent with the invention. That is, comparison could be made between the frequency function for a region at the first time and the frequency function for the same region at a later time. As well, the spatial boundary between the normal tissue and abnormal tissue could be recognized. Such a boundary itself could also be characterized to show growth rate, tumor impact, etc.

Application of the invention to a color image could involve creating gradient vector clouds in each color component (e.g., RGB, HSV). The interactions between each color plane could yield more refined boundary characterization than from a single plane or gray scale representation. Further refinement could be achieved by applying Gaussian parameterization. More generally, gradient vectors may be produced by differencing 912 the frequency functions defined by a Gaussian distribution (for instance) about two points in the domain of interest with some selected variance. The sign of the resulting gradient vectors is positive if the variance in the frequency space is increasing or zero and negative otherwise. The region of interest within the space is iteratively sampled to produce a cloud of gradient vectors related to the entire surface of the region of interest, and the resulting gradient vectors are analyzed during step 916. Where groups of gradient vectors are similar in direction and/or magnitude this indicates a high degree of similarity and indicates a boundary.

Another embodiment operates on digital data sets extracted from email messages, newsgroup postings, and/or other textual sources. Thematic, discussion thread, and other semantic content maps may then be created.

Another embodiment operates on sonar 1016, radar 1018, Doppler radar 1018, or other images, assisting in the identification and characterization of boundaries formed by (a) objects off of which the radar/sonar signal reflected and/or (b) boundaries defined by differences in the medium through which the radar/sonar signal traveled, such as thermal layers or high-pressure/low-pressure boundaries. Note that in this case, as others, edges need not be one-dimensional but may instead have greater dimensionality.

Another embodiment operates on data stored on badly degraded media to assist data recovery by identifying, for instance, magnetic directions which are below the signal-to-noise ratio for normal operation of electromechanical devices such as computer hard disk controllers.

Summary

In summary, the present invention provides novel systems, signals, devices, and methods for detecting and characterizing boundaries in digital data sets. Although particular embodiments such as method embodiments or signal embodiments are expressly described herein, it will be appreciated that other embodiments such as apparatus and article embodiments may be formed according to the present invention. Unless otherwise expressly indicted, the description herein of methods and signals of the present invention therefore extends to corresponding apparatus and articles, and the description of apparatus and articles of the present invention extends likewise to corresponding methods and signals. This prevents unnecessary repetition herein.

Although reference is generally made herein to first and second points, it will be understood that the inventive steps may be repeated to operate on a second and third point, a third and fourth point, and so on. The terminology "first point" and "second point" as used herein (including its uses in the claims) is intended merely to distinguish between the at least two points. It is not meant to impose a particular order of selection or operation. Nor is the terminology meant to rule out the possibility that one or more other points have already been chosen or otherwise been the subject of the inventive method.

As used herein, terms such as "a" and "the" and item designations such as "computer" are generally inclusive of one or more of the indicated item. In particular, in the claims a reference to an item generally means at least one such item is required.

The invention may be embodied in other specific forms without departing from its essential characteristics. The described embodiments are to be considered in all respects only as illustrative and not restrictive. Any explanations provided herein of the scientific and mathematical principles employed in the present invention are illustrative only. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for boundary analysis in a digital data set, the method comprising the steps of:
   associating a first JRC function with a first point in the digital data set;
   associating a second JRC function with a second point in the digital data set;
   calculating a distance between the two JRC functions; and
   using the distance to perform boundary analysis on at least a portion of the digital data set.

2. The method of claim 1, wherein the first associating step comprises choosing a cluster of sample points distributed around the first point, and the second associating step comprises choosing a cluster of sample points distributed around the second point, and each cluster contains the same number of sample points distributed according to the same distribution function and the same variance.

3. The method of claim 1, wherein the first associating step comprises choosing a cluster of sample points distributed around the first point, and the second associating step comprises choosing a cluster of sample points distributed around the second point, and the clusters differ from one another in at least one of the number of sample points in the cluster, the distribution which distributes the sample points, and the variance of the distribution of sample points.

4. The method of claim 1, wherein each JRC function is a frequency function.

5. The method of claim 1, wherein the calculating step calculates distance according to a standard Lebesgue measure.

6. The method of claim 5, wherein the using step associates a positive or negative sign with distance by associating a positive sign with a distance when the statistical variance (sigma squared) is increasing and by associating a negative sign with the distance when the statistical variance is decreasing.

7. The method of claim 1, wherein the step of using the distance to perform boundary analysis comprises obtaining and analyzing frequency derivatives.

8. The method of claim 1, wherein the step of using the distance to perform boundary analysis comprises obtaining and analyzing frequency gradients.

9. The method of claim 1, wherein the digital data set includes pixels, each associating step utilizes a division of the range of possible pixel values into intervals, and at least one of the intervals covers more than one possible pixel value.

10. The method of claim 1, wherein the first point and the second point have spatial coordinates which are separated by an adjustable increment.

11. The method of claim 1, wherein the associating steps and the calculating step are repeated a plurality of times with additional points before the resulting distances are used to perform boundary analysis.

12. The method of claim 1, wherein the associating steps and the calculating step are repeated a plurality of times on the same points with different cluster size, cluster distribution, and/or cluster variances, and the results are correlated during the using step.

13. A boundary analysis computer system comprising:
   a digital data set memory capable of holding at least a portion of a digital data set;
   at least one processing unit configured to associate a first JRC function with a first point in the digital data set, associate a second JRC function with a second point in the digital data set, and calculate a distance between the two JRC functions; and
   an output device configured to transmit an output signal from the processing unit.

14. The system of claim 13, wherein the processing unit comprises a microprocessor and a program memory containing executable instructions, and execution of the instructions calculates a frequency derivative.

15. The system of claim 13, wherein the memory holds a digital data set representing a medical image.

16. The system of claim 13, wherein the memory holds a digital data set representing a high-altitude or satellite image.

17. The system of claim 13, wherein the memory holds a digital data set representing a sonar image.

18. The system of claim 13, wherein the memory holds a digital data set representing a radar image.

19. The system of claim 13, wherein the memory holds a digital data set representing a retouched image.

20. The system of claim 19, wherein the retouched image includes an air brushed portion.

21. The system of claim 19, wherein the retouched image includes a pasted portion.

22. The system of claim 19, wherein the retouched image includes a watermark portion.

23. The system of claim 19, wherein the retouched image includes a steganographically hidden message, and the system identifies patterns of superimposed apparent noise.

24. The system of claim 13, wherein the memory holds a digital data set representing a weather system image.

25. A computer storage medium having a configuration that represents data and instructions which will cause performance of method steps for boundary analysis, the method comprising the steps of:
   associating a first frequency function with a first point in the digital data set;
   associating a second frequency function with a second point in the digital data set;
   calculating a distance between the two frequency functions; and using the distance to perform boundary analysis on at least a portion of the digital data set.

26. The configured storage medium of claim 25, wherein the first associating step comprises choosing a cluster of sample points distributed around the first point, and the second associating step comprises choosing a cluster of sample points distributed around the second point, and each cluster contains the same number of sample points distributed according to the same distribution function and the same variance.

27. The configured storage medium of claim 25, wherein the first associating step comprises choosing a cluster of sample points distributed around the first point, and the second associating step comprises choosing a cluster of sample points distributed around the second point, and the clusters differ from one another in at least one of the number of sample points in the cluster, the distribution which distributes the sample points, and the variance of the distribution of sample points.

28. The configured storage medium of claim 25, wherein the associating steps and the calculating step are repeated a plurality of times with additional points before the resulting distances are used to perform boundary analysis.

29. The configured storage medium of claim 25, where in the associating steps and the calculating step are repeated a plurality of times on the same points with different cluster size, cluster distribution, and/or cluster variances, and the results are correlated during the using step.

30. An edge detection data signal embodied in a computer readable medium, the signal comprising at least one pair of points from a digital data set, and a distance between at least one pair of JRC functions, each of the JRC functions associated with one of the points from the digital data set.

31. The signal of claim 30, further comprising at least one pair of sample point clusters corresponding to the at least one pair of points.

32. The signal of claim 30, further comprising the digital data set from which the at least one pair of points was obtained.

33. The signal of claim 32, wherein the digital data set comprises pixels.

34. The signal of claim 30, further comprising the at least one pair of JRC functions.

* * * * *

UNITED STATES PATENT AND TRADEMARK OFFICE
CERTIFICATE OF CORRECTION

PATENT NO. : 6,697,497 B1
DATED : February 24, 2004
INVENTOR(S) : Jensen et al.

It is certified that error appears in the above-identified patent and that said Letters Patent is hereby corrected as shown below:

Column 5,
Line 30, "thereof The servers" should read -- thereof. The servers --.

Column 6,
Line 24, "y=[$y_1$, $Y_2$, $Y_3$, $Y_m$], x =[$x_1$, $x_2$, $X_3$, ... $x_n$]." should read
-- y=[$y_1$, $y_2$, $y_3$,... $y_m$], x =[$x_1$, $x_2$, $x_3$, ... $x_n$]. --.
Line 64, "active-pathological" should read -- active pathological --.

Signed and Sealed this

Third Day of May, 2005

JON W. DUDAS
*Director of the United States Patent and Trademark Office*